United States Patent [19]

Suzuki

[11] Patent Number: 4,750,062
[45] Date of Patent: Jun. 7, 1988

[54] ROTATABLE TAPE LOADING DEVICE IN A MAGNETIC TAPE RECORDER-REPRODUCER APPARATUS

[75] Inventor: Shoji Suzuki, Iwaki, Japan
[73] Assignee: Alpine Electronics Ltd., Japan
[21] Appl. No.: 724,616
[22] Filed: Apr. 18, 1985

[30] Foreign Application Priority Data

Apr. 19, 1984 [JP] Japan ............................. 59-56599[U]
Apr. 19, 1984 [JP] Japan ............................. 59-56600[U]
Apr. 19, 1984 [JP] Japan ............................. 59-56601[U]
Apr. 19, 1984 [JP] Japan ............................. 59-56602[U]

[51] Int. Cl.⁴ ............................................. G11B 15/66
[52] U.S. Cl. .......................................... 360/85; 360/95
[58] Field of Search ................ 360/85, 95, 105, 130.3; 242/55.19 R

[56] References Cited

U.S. PATENT DOCUMENTS 3,660,614  5/1972  Swaim et al. ........................... 360/85
4,092,686  5/1978  Schulz ................................ 360/95 X
4,514,774  4/1985  Sims, Jr. ................................ 360/85
4,517,614  5/1985  Straub et al. ....................... 360/85 X
4,562,496 12/1985  Saito et al. ......................... 360/85 X
4,563,717  1/1986  Fleck et al. ............................. 360/85
4,578,725  3/1986  Muller .................................... 360/95
4,583,136  4/1986  Tsuchida et al. ................. 360/85 X
4,583,137  4/1986  Ogiro et al. ........................... 360/95
4,593,330  6/1986  Warren ............................. 360/85 X
4,595,962  6/1986  Costemore d'Arc ................. 360/95
4,599,667  7/1986  van Blerk ......................... 360/106 X

FOREIGN PATENT DOCUMENTS 57-135476  8/1982  Japan ..................................... 360/95
58-115651  7/1983  Japan ..................................... 360/95
58-220266 12/1983  Japan ..................................... 360/95
60-253056 12/1985  Japan ................................. 360/130.3

Primary Examiner—John H. Wolff
Assistant Examiner—Alfonso Garcia
Attorney, Agent, or Firm—Guy W. Shoup

[57] ABSTRACT

A recorder-reproducer includes a rotary head cylinder against which a tape from a tape cassette is slidable, two movable bodies for moving the tape toward and away from the rotary head cylinder, two connectors having ends angularly movably coupled to the movable bodies, respectively, and a sole rotatable body to which opposite ends of the connectors are angularly movably coupled. The rotatable body has a recessed portion with at least one of the connectors being positioned for interference with the recessed portion. At least one of the connectors has two relatively slidable connector plates and a spring acting therebetween. The recorder-reproducer also includes a pivot shaft about which the rotatable body is rotatable, at least one of the connectors having a means for preventing said one of the connectors from interfering with the pivot shaft. The recorder-reproducer further includes a capstan shaft and a pinch roller for sandwiching the tape therebetween, and a pinch roller drive means responsive to rotation of the rotatable body for turning the pinch roller toward and away from the capstan shaft. The spring has a spring force selected such that when the movable bodies are stopped after the tape is loaded against the rotary head cylinder, a first force imposed on the rotatable body through the connector with the spring is greater than a second force applied, in a direction opposite to the first force, to the rotatable body through the pinch roller drive means as the pinch roller is pressed against the capstan shaft.

5 Claims, 2 Drawing Sheets

ROTATABLE TAPE LOADING DEVICE IN A MAGNETIC TAPE RECORDER-REPRODUCER APPARATUS

The subject matter of this application is related to my co-pending U.S. application Ser. No. 716,743.

BACKGROUND OF THE INVENTION

The present invention relates to a recorder-reproducer, and more particularly to a recorder-reproducer having a rotary head cylinder for slidable engagment with a tape.

Conventional recorder-reproducers with a tape cassette loaded therein record analog signals on and reproduce analog signals from a tape. To make tape cassettes smaller in size and record signals at a higher packing density, there is a growing demand for recording and reproducing sounds with digital signals using DAT (digital audio tape), and research and development efforts are now in progress in various laboratories to meet such a demand. However, no preferable recorder-reproducer has yet been proposed for use with DAT.

SUMMARY OF THE INVENTION

It is an object of the present invention to provide a recorder-reproducer capable of recording and reproducing sounds with digital signals.

According to the present invention, there is provided a recorder-reproducer comprising a rotary head cylinder against which a tape from a tape cassette is slidable, a pair of movable bodies for moving the tape in directions toward and away from the rotary head cylinder, a pair of connectors having ends angularly movably coupled to the movable bodies, respectively, and a sole rotatable body to which opposite ends of the connectors are angularly movably coupled, the rotatable body having a recessed portion, at least one of the connectors being positioned for interference with the recessed portion.

According to the present invention, there is also provided a recorder-reproducer comprising a rotary head cylinder against which a tape from a tape cassette is slidable, a pair of movable bodies for moving the tape in directions toward and away from the rotary head cylinder, a pair of connectors having ends angularly movably coupled to the movable bodies, respectively, and a sole rotatable body to which opposite ends of the connectors are angularly movably coupled, at least one of the connectors comprising two relatively slidable connector plates and a spring acting between the connector plates.

According to the present invention, there is also provided a recorder-reproducer comprising a rotary head cylinder against which a tape from a tape cassette is slidable, a pair of movable bodies for moving the tape in directions toward and away from the rotary head cylinder, a pair of connectors having ends angularly movably coupled to the movable bodies, respectively, a sole rotatable body to which opposite ends of the connectors are angularly movably coupled, and a pivot shaft about which the rotatable body is rotatable, at least one of the connectors having a means for preventing the one of the connectors from interfering with the pivot shaft.

According to the present invention, there is also provided a recorder-reproducer comprising a rotary head cylinder against which a tape from a tape cassette is slidable, a pair of movable bodies for moving the tape in directions toward and away from the rotary head cylinder, a pair of connectors having ends angularly movably coupled to the movable bodies, respectively, a sole rotatable body to which opposite ends of the connectors are angularly movably coupled, a capstan shaft and a pinch roller for sandwiching the tape therebetween, and a pinch roller drive means responsive to rotation of the rotatable body for turning the pinch roller in directions toward and away from the capstan shaft, at least one of the connectors comprising two relatively slidable connector plates and a spring acting between the connector plates, the spring having a spring force selected such that when the movable bodies are stopped upon completion of loading of the tape against the rotary head cylinder, a first force imposed on the rotatable body through the connector with the spring is greater than a second force applied, in a direction opposite to the first force, to the rotatable body through the pinch roller drive means as the pinch roller is pressed against the capstan shaft.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

FIGS. 1 through 4 illustrate a recorder-reproducer according to an embodiment of the present invention.

Figure 1:
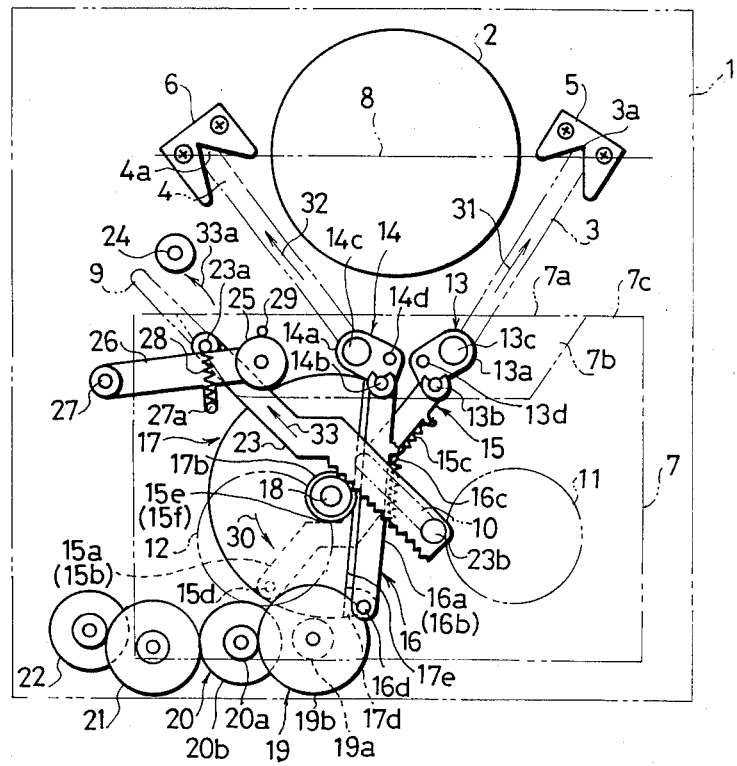
FIG. 1 is a plan view of a recorder-reproducer according to the present invention, with the parts positioned prior to starting to load a tape.

As shown in FIG. 1, the recorder-reproducer includes a chassis 1 with a rotary head cylinder 2 mounted thereon. The rotary head cylinder 2 comprises a rotatable upper portion with magnetic heads (not shown) mounted thereon and a nonrotatable lower portion fixed to the chassis 1. The chassis 1 has a pair of straight guide slots 3, 4 defined therein spreading progressively away from each other with the rotary head cylinder 2 disposed therebetween. Stoppers 5, 6 are fixed to the chassis 1 at ends 3a, 4a of the straight slots 3, 4, respectively. Designated at 7 is a tape cassette, indicated by two-dot-and-dash lines, which contains a digital audio tape 7a, the tape cassette 7 having a recess 7b. The ends 3a, 4a of the guide slots 3, 4 are positioned slightly beyond an imaginary line 8 passing diametrially through the rotary head cylinder 2 parallel to a front edge 7c of the tape cassette 7 as loaded as shown in FIG. 1. The chassis 1 also has oblong holes 9, 10 defined therein and indicated by two-dot-and-dash lines. Designated at 11, 12 are a supply reel for supplying the tape 7a in the tape casssette 7 and a take-up reel for widing the tape 7a.

Figure 2:
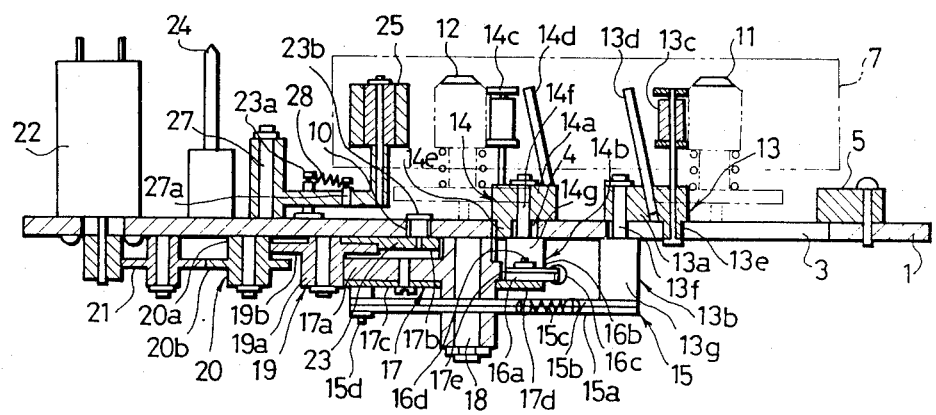
FIG. 2 is a vertical cross-sectional view showing the parts before the tape starts to be loaded.

Movable bodies 13, 14 are movable along the guide slots 3, 4, respectively for moving the tape 7a from the tape cassette 7 toward and away from the rotary head cylinder 2. The movable body 13 comprises a base 13a disposed on the chassis 1, a shaft 13b attached to the base 13a, a guide post 13c fixed to and located above the base 13a for guiding the tape 7a, and an inlined post 13d attached to the base 13a. As shown in FIG. 2, the base 13a has a projection 13e on its lower side, movably engaging in the guide slot 3. The shaft 13b includes a smaller-diameter portion 13f movably engaging in the guide slot 3 and a larger-diameter portion 13g extending downwardly from the smaller-diameter portion 13f. Likewise, the movable body 14 has a base 14a having a projection 14e a shaft 14b having a smaller-diameter portion 14f and a larger-diameter portion 14g, a guide post 14c, and an inclined post 14d.

Figure 4:
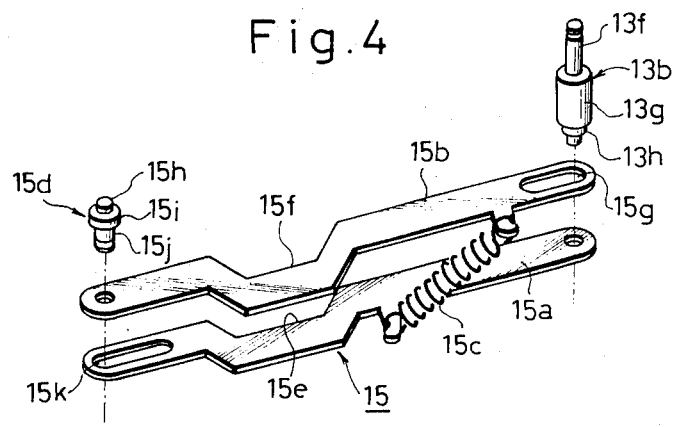
FIG. 4 is an exploded perspective view of connector members in the recorder-reproducer.

Connectors 15, 16 have ends coupled respectively to the movable bodies 13, 14 for rotation with respect thereto. As shown in FIG. 4, the connector 15 is composed of a connector plate 15a angularly movably connected at one end to the shaft 13b of the movable body 13, a connector plate 15b disposed over the connector plate 15a for sliding movement with respect thereto and movably coupled at one end to the shaft 13b, a spring 15c acting between the connector plates 15a, 15b, and a shaft 15d interconnecting the other ends of the connector plates 15a, 15b. The connector plates 15a, 15b have intermediate C-shaped bent portions 15e, 15f, respectively. The connector plate 15b has an oblong hole 15g defined in its end connected to the shaft 13b, and the shaft 13b has a neck 13h extending downwardly from the larger-diameter portion 13g and movably engaging in the oblong hole 15g. The shaft 15d includes a smaller-diameter portion 15h, a larger-diameter portion 15i disposed below the smaller-diameter portion 15h, and a neck 15j disposed below the larger-diameter portion 15i. The connector plate 15a has in its other end an oblong hole 15k in which the neck 15j of the shaft 15d engages movably.

Figure 3:
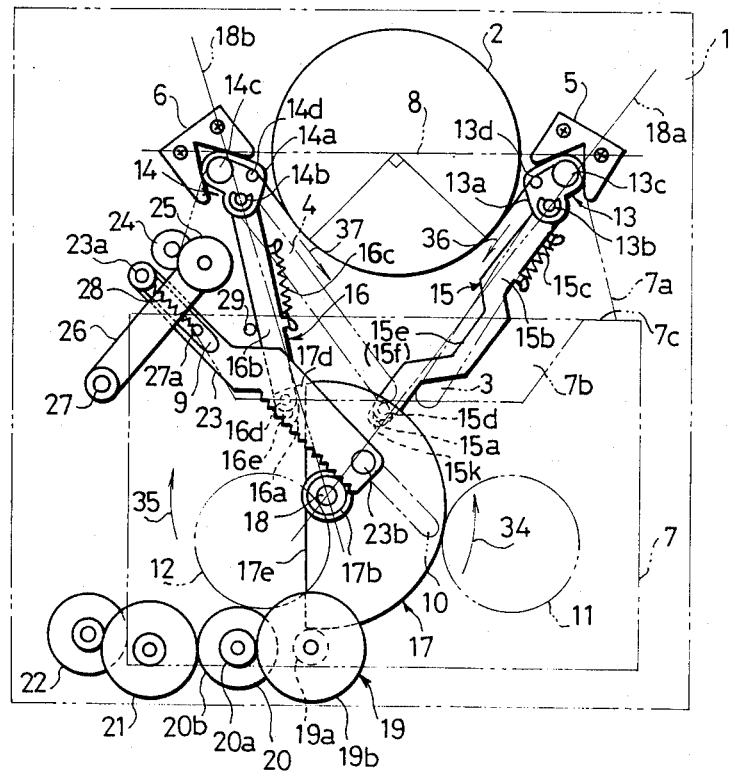
FIG. 3 is a plan view of the recorder-reproducer, showing the parts when the tape has been loaded.

As illustrated in FIGS. 2 and 3, the connector plate 16 has a connector plate 16a angularly movably connected at one end to the shaft 14b of the movable body 14, a connector plate 16b disposed over the connector plate 16a for sliding movement with respect thereto and movably coupled at one end to the shaft 14b, a spring 16c acting between the connector plates 16a, 16b, and a shaft 16d interconnecting the other ends of the connector plates 16a, 16b. The connector plates 16a, 16b have overall straight shapes. Although not shown, the connector plate 16b has an oblong hole defined in its end connected to the shaft 14b, and the shaft 14b movably engages in that oblong hole. The connector plate 16a has in its other end coupled to the shaft 16d an oblong hole 16e in which the shaft 16d engages movably.

There is a rotatable body 17 to which the other ends of the connectors 15, 16 are angularly movably connected. The rotatable body 17 is composed of a semicircular gear 17a, a smaller-diameter gear 17b disposed above and integral coaxially with the gear 17a, and a base plate 17c mounted on the gear 17a and substantially identical in shape to the gear 17a. The shaft 15d of the connector 15 is angularly movably coupled to a reverse side of the base plate 17c. The shaft 16d of the connector 16 is angularly movably connected to a projecting portion 17d of the base plate 17c. The connector 16 is vertically positioned so as to interfere with a recessed portion 17e of the gear 17a. The rotatable body 17 is rotatable about a pivot shaft 18 supported on the chassis 1.

The rotatable body 17 is movable from the position of FIG. 1 to the position of FIG. 3, in which the shaft 15d of the connector 15 is positioned beyond an imaginary line 18a connecting the pivot shaft 18 of the rotatable body 17 and the shaft 13b of the movable body 13, and the shaft 16d of the connector 16 is positioned beyond a hypothetical line 18b connecting the pivot shaft 18 and the shaft 14b of the movable body 14, as shown in FIG. 3. When the connector 15 is positioned closest to the pivot shaft 18, as illustrated in FIG. 1, the bent portions 15e, 15f of the connector plates 15a, 15b are disposed in confronting relation to the pivot shaft 13 out of engagement therewith. Therefore, the bent portions 15a, 15b serve as means for preventing the connector plates 15a, 15b from interfering with the pivot shaft 18.

A gear 19 includes a smaller-diameter gear section 19a meshing with the gear 17a of the rotatable body 17, and a larger-diameter gear section 19b positioned upwardly of the smaller-diameter gear section 19a. A gear 20 has a smaller-diameter gear section 20a meshing with the larger-diameter gear 19b, and a larger-diameter gear section 20b positioned downwardly of the smaller-diameter gear section 20a. A gear 21 is held in mesh with the larger-diameter gear section 20b and rotatable by a motor 22 mounted on the chassis 1.

A rack 23 is held in mesh with the smaller-diameter gear 17b of the rotatable body 17, and has on one end a shaft 23a movably engaging in the oblong hole 9 in the chassis 1, and on the other end a sahft 23b movably engaging in the oblong hole 10 in the chassis 1. A capstan shaft 24 is fixed to the chassis 1. A pinch roller 25 engageable with the capstan shaft 24 is supported by an arm 26 which is angularly movably supported by a shaft 27 fixed to the chassis 1. A spring 28 has one end engaging the shaft 23a of the rack 23 and an opposite end engaging a pin 27a on a projection of the arm 26 for normally urging the arm in a direction toward the shaft 23a. A stopper pin 29 is mounted on the chassis 1 for stopping the connector 16 against movement. The rack 23, the spring 28, the arm 26, and the shaft 27 jointly constitute a pinch roller drive means for angularly moving the pinch roller 25 in directions toward and away from the capstan shaft 24.

The forces from the springs 15c, 15c of the connectors 15, 16 serve as forces tending to rotate the rotatable body 17 counterclockwise in FIG. 3 through the connectors 15, 16. The force from the spring 28 engaging the arm 26 of the pinch roller 25 serves as a force tending to rotate the rotatable body 17 clockwise through the rack 23. The forces of the springs 15c, 16c, 28 are selected such that the forces of the springs 15c, 16c tending to rotate the rotatable body 17 are greater than the force of the spring 28 tending to rotate the rotatable body 17.

A mechanism for loading and unloading the tape cassette 7, and a mechanism for driving the reels 11, 12 are omitted from illustration. However, these mechanisms may comprise conventional mechanisms in known analog recorder-reproducers.

Operation of the recorder-reproducer thus constructed is as follows:

As shown in FIGS. 1 and 2, before the tape starts to be loaded with the tape cassette 7 engaging the reels 11, 12, the movable bodies 13, 14 are positioned at ends of the guide slots 3, 4 which are farthest from the stoppers 5, 6 and within the recess 7b in the tape cassette 7. In this position, the guide posts 13c, 14c and the inclined posts 13d, 14d are engageable with the tape 7a in the tape casstte 7. The pinch roler 25 is also positioned within the recess 7b for engagement with the tape 7a.

The connector 16 is in interference with the recessed portion 17e of the rotatable body 17, and the bent portions 15e, 15f of the connector plates 15a, 15b of the connector 15 are disposed in confronting relation to the pivot shaft 18 out of interference therewith. At this time, the connector 15 is positioned under the resiliency of the spring 15c such that the shaft 13b of the movable body 13 is located at an outermost edge of the oblong hole 15k in the connector plate 15a, the shaft 13b being spaced farthest from the shaft 15d. Likewise, the connector 16 is positioned under the resiliency of the spring 16c such that the shaft 14b of the movable body 14 is spaced farthest from the shaft 16d.

The shafts 23a, 23b on the rack 23 are positioned in engagement with ends of the oblong holes 9, 10 in the chassis 1. Thus, the arm 26 and hence the pinch roller 25 are located fartheset from the capstan shaft 24.

When the motor 22 is energized in this condition, the gear 21 is rotated to rotate the gears 20, 19 to cause the smaller-diameter gear section 19a to rotate the semicircular gear 17a, the smaller-diameter gear 17b, and the base plate 17c, that is, the rotatable body 17 in the direction of the arrow 30 in FIG. 1. The rotation of the rotatable body 17 moves the connectors 15, 16 and the rack 23.

As the connectors 15, 16 move, the movable bodies 13, 14 are moved in the directions of the arrows 31, 32 in FIG. 1 along the guide holes 3, 4 while the projections 13e, 14e of the bases 13a, 14a and the smaller-diameter portions 13f, 14f of the shafts 13b, 14b are being guided in and by the guide holes 3, 4. During this guided movement, the movable bodies 13, 14 are held against rotation, that is, maintain their orientation as shown in FIG. 1. The guide posts 13c, 14c and the inclined posts 13d, 14d engage the tape 7a to pull the same out of the tape cassette 7.

On continued rotation of the rotatable body 17, the movable bodies 13, 14 abut against the stoppers 5, 6 to stop their movement, whereupon the shaft 18 of the rotatable body 17, the shaft 15d of the connector 15, and the shaft 13d of the movable body 13 are aligned rectilinearly on the imaginary line 18a shown in FIG. 3, and the shaft 18, the shaft 16d of the connector 16, and the shaft 14b of the movable body 14 are aligned rectilinearly on the imaginary line 18b. Continued rotation of the rotatable body 17 causes the shafts 15d, 16d to move beyond the imaginary lines 18a, 18b, bringing the connector 16 into abutment against the stopper pin 29. When the connector 16 abuts against the stopper pin 29, a switch (not shown) detects such abutment and produces a signal for enabling a control unit (not shown) to issue a de-energization signal to the motor 22, wherepon the motor 22 is stopped to stop the rotatable body 17 against rotation. The parts are now positioned as illustrated in FIG. 3.

During a time interval after the movable bodies 13, 14 engage the stoppers 5, 6 and before the rotatable body 17 stops its rotation, the shaft 13b moves in the oblong hole 15g in the connector plate 15b, the shaft 15d moves in the oblong hole 15g in the connector plate 15b, the shaft 14b moves in the oblong hole (not shown) in the connector plate 16b, and the shaft 16d moves in the oblong hole 16e in the connector plate 16a, against the resilient forces of the springs 15c, 16c, so that the connector plates 15a, 15b, 16a, 16b move relatively to each other. When the movable body 17 stops in the position of FIG. 3, the forces of the springs 15c, 16c act on the rotatable body 17 through the connectors 15, 16 to impose forces tending to rotate the rotatable body 17 counterclockwise (FIG. 3) in the direction of the arrow 34 regardless of the fact that the motor 22 has been de-energized.

On rotation of the rotatable body 17 in the direction of the arrow 30 in FIG. 1, the rack 23 is moved in the direction of the arrow 33 while the shafts 23a, 23b are being guided in and by the oblong holes 9, 10. The arm 26 and hence the pinch roller 25 are angularly moved in the direction of the arrow 33a in FIG. 1 through the shaft 23a, the spring 28, and the pin 27a. Continued rotation of the rotatable body 17 turns the arm 26 to cause the pinch roller 25 to press the tape 7a against the capstan shaft 24. Further rotation of the rotatable body 17 causes the shafts 23a, 23b of the rack 23 to reach the ends of the oblong holes 9, 10. At this time the pinch roller 25 engages and is pressed well against the capstan shaft 23 under the force of the spring 28 extended as the shaft 23a is moved, so that the tape 7a is sandwiched between the capstan shaft 24 and the pinch roller 25. The force of the spring 28 acts through the shaft 23a and the rack 23 on the rotatable body 17, which tends to be rotated in the direction of the arrow 35 in FIG. 3. After the tape 7a has been loaded as shown in FIG. 3, however, the rotatable body 17 is subjected to a force tending to rotate the same in the direction of the arrow 34 in FIG. 3, the force corresponding to the difference between the greater forces of the springs 15c, 16c and the smaller force of the spring 28.

Upon completion of the tape loading, the tape 7a is held in contact with the rotary head cylinder 2 substantially along a 90° arc. By energizing the reel drive means, not shown, and rotating the rotary head cylinder 2, the tape 7a runs slidably against the rotary head cylinder 2 and is continuously wound around the takeup reel 12 for recording and reproducing desired sounds.

The tape 7a can be unloaded in a manner which is a reversal of the foregoing operation. More specifically, the motor 22 is reversed to rotate the rotatable body 17 in the direction of the arrow 34 in FIG. 3 through the gears 21, 20, 19, and the reel drive means is energized to rotate the takeup reel 12 to wind the tape 7a therearound. The movable bodies 13, 14 are guided by the guide slots 3, 4 through the connectors 15, 16 to move in the directions of the arrows 36, 37. When the shafts 13b, 14b abuts against the ends of the guide slots 3, 4, the movable bodies 13, 14 are stopped in the position of FIG. 1. After the movable bodies 13, 14 have been brought to a stop, the motor 22 is de-energized.

With the foregoing arrangement, the rotatable body 17 and the connectors 15, 16 coupled thereto cause the movable bodies 13, 14 to move in a direction toward the rotary head cylinder 2. Therefore, the tape 7a can be brought out of the tape cassette 7 reliably into sliding engagement with the rotary head cylinder 2, so that sounds can then be recorded and reproduced with digital signals.

Since the movable bodies 13, 14 are moved together through the connectors 15, 16 by the single rotatable body 17, the tape loading and unloading mechanism is simple in construction, is composed of a reduced number of parts, and can be manufactured inexpensively.

The movable bodies 13, 14 moved commonly by the single rotatable body 17 travel through intervals which remain the same throughout the entire stroke.

The rotatable body 17 has the recessed portion 17e and the connector 16 connecting the rotatable body 17 and the movable body 14 is positioned for interference with the recessed portion 17e. Therefore, the overall configuration of the rotatable body 17 may be small, and the space available for the connector 16 may be small.

Before the tape 7a starts to be loaded or after the tape 7a has been unloaded, the connector 16 can be brought into interference with the recessed portion 17e of the rotatable body 17. Therefore, the recessed portion 17e and the connector 16 serves as a stopper for preventing the rotatable body 17 from rotating clockwise in FIG. 1 before the tape 7a starts to be loaded or after the tape 7a has been unloaded. Rotation of the rotatable body 17 can accurately be controlled without providing any other special stopper.

As described above, the connectors 15, 16 are composed of the relatively slidable connector plates 15a, 15b, the connector plates 16a, 16b, the springs 15c, 16c acting between the connector plates 15a, 15b and between the connector plates 16a, 16b. Any variations, or overstrokes, in the distances between the shafts 13b, 14b of the movable bodies 13, 14 and the shafts 15d, 16d by which the connectors 15, 16 are coupled to the rotatable body 17 can well be taken up by sliding movement between the connector plates 15a, 15b or between the connector plates 16a, 16b.

The connector plates 15a, 15b of the connector 15 coupled to the rotatable body 17 have the C-shaped bent portions 15e, 15f or interference prevension means for preventing the connector plates 15a, 15b from interfering the pivot shaft 18 about which the rotatable body 17 is rotatable. Therefore, the pivot shaft 18 may have an increased length.

The pinch roller drive means for transmitting angular movement of the rotatable body 17 to the pinch roller 25 is composed of the rack 23, the spring 28, the arm 26, and the shaft 27. The connectors 15, 16 have the connector plates 15a, 15b, 16a, 16b and the springs 15c, 16c acting between the connector plates 15a, 15b and between the connector plates 16a, 16b. The forces of the springs 15c, 16c are selected such that when the movable bodies 13, 14 are stopped upon completion of the tape loading, the forces imposed on the rotatable body 17 through the connectors 15, 16 are greater than the force applied to the rotatable body 17 through the pinch roller drive means as the pinch roller 25 is pressed against the capstan shaft 24. Therefore, the rotatable body 17 can be locked against rotation in the direction of the arrow 35 in FIG. 3 without having to provide any special locking means. Although not shown, a means may be provided for turning only the pinch roller 25 in a direction away from the position of FIG. 3 or the capstan shaft 24. Stated otherwise, the force tending to rotate the rotatable body 17 through the connectors 15, 16 is sufficiently maintained to keep the rotatable body 17 at rest while the pinch roller 25 is being turned. With such an arrangement, review and cue modes can easily be achieved.

Although in the above embodiment the connector 16 serves as a stopper for interference with the recessed portion 17e of the rotatable body 17, neverthless the present invention is not limited to such a construction. For example, the configuration of the recessed portion 17e may be appropriately selected to enable the connector 16 to serve as a stopper for interfering with the recessed portion 17e to stop rotation of the rotatable body 17. Alternatively, both the connectors 15, 16 may serve as stoppers for interference with the rotatable body 17.

In the illustrated embodiment, both of the connectors 15, 16 have the two connector plates 15a, 15b and the spring 15c, and the two connector plates 16a, 16b and the spring 16c. However, the present invention is in no way limited to this arrangement, but one of the connectors 15, 16 may be composed of a single connector plate having no spring.

While in the illustrated embodiment the connector plates 15a, 15b of the connector 15 has the interference prevention means, or the bent portions 15e, 15f, for preventing the connector plates 15a, 15b from interference with the pivot shaft 18, the connector 16 may have such an interference prevention means for preventing interference with the pivot shaft 18 dependent on the configuration of the rotatable body 17, or alternatively both of the connectors 15, 16 may have interference prevention means for preventing interference with the pivot shaft 18. The interference prevention means is not limited to the C-shaped bent portions as shown in FIGS. 1, 3, and 4. For example, where the rotatable body 17 is located in a position different from that of FIG. 2, the interference prevention means may be of an arcuate shape disposed above the pivot shaft 18.

In the above embodiment, the movable bodies 13, 14 are movable in the guide slots 3, 4 defined in the chassis 1. However, the shape of the guide slots 3, 4 and the manner in which the movable bodies 13, 14 engage in the guide slots 3, 4 are not restricted to the illustrated arrangement. As an example, a subchassis may be mounted in confronting relation to and upwardly of the chassis 1, and one of the guide slots 3 may be defined in the chassis 1 while the other guide slot 4 may be defined in the subchassis.

Advantages of the invention:

As described above, a recorder-reproducer of the present invention is essentially composed of a single rotatable body and a pair of connectors operatively coupled to the rotatable body for moving a tape from a tape cassette in directions toward and away from a rotary head cylinder to bring the tape reliably into and out of sliding contact with the rotary head cylinder for recording and reproducing sounds with digital signals.

Since two movable bodies which the tape engages are moved by the single rotatable body, the movable bodies move identical intervals with stability at all times.

The rotatable body has a recessed portion and at least one of the connectors by which the movable bodies are connected to the rotatable body is positioned for interference with the recessed portion. The rotatable as a whole can thus be made smaller in size, and the space for positioning the connectors therein may be small, with the result that the recorder-reproducer can be small in size.

Before the tape starts being loaded or after the tape has been unloaded, the connector can be brought into interference with the recessed portion of the rotatable body. Therefore, the recessed portion and the connector serve as a stopper for preventing the rotatable body from being rotated before the tape starts being loaded or after the tape has been unloaded. No other special stopper is required. Rotation of the rotatable body can accurately be controlled, resulting in a stable tape loading capability.

Since at least one of the connectors has two relatively slidable connector plates and a spring acting therebetween, any difference, or overstroke, between the position of the movable bodies and the position of the members by which the connectors are coupled to the rotatable body can well be taken up by sliding movement between the two connector plates. This also results in a stable tape loading capability.

One of the connectors coupled to the rotatable body has an interference prevention means for preventing the connector from interfering with the pivot shaft about which the rotatable body is rotatable. Thus, the length of the pivot shaft can be sufficiently large to avoid an undue load on the pivot shaft and allow the rotatable body to rotate with high accuracy. This arrangement further contributes to a stable tape loading capability.

There is a pinch roller drive means for transmitting angular movement of the rotatable body to the pinch roller, and at least one of the connectors has two relatively slidable connector plates and a spring acting therebetween. The force of the spring is selected such that when the movable bodies are stopped upon completion of the tape loading, the force imposed on the rotatable body through the connector with the spring is greater than the force applied, in a direction opposite to the above force, to the rotatable body through the pinch roller drive means as the pinch roller is pressed against the capstan shaft. Therefore, the rotatable body can be locked against rotation without having to provide any special locking means. The force tending to rotate the rotatable body through the connector with the spring is sufficiently maintained, or the rotatable body is locked, while the pinch roller can be moved away from the capstan shaft. With this arrangement, review and cue modes can easily be achieved, and stable tape running performance can be achieved.

Although a certain preferred embodiment has been shown and described, it should be understood that many changes and modifications may be made therein without departing from the scope of the appended claims.

What is claimed is:

1. A tape loading mechanism for loading a magnetic tape from a tape cassette inserted in a recorder-reproducer apparatus, having a rotary head cylinder disposed in a horizontal plane oppoiste from the inserted tape cassette by a given distance, by pulling the tape out of the cassette and bringing it across the given distance from an unloaded position to a loaded position into sliding contact with the rotary head cylinder, comprising:

a single rotatable body (17) mounted on a pivot shaft (18) disposed in parallel in a horizontal plane under the plane of the inserted cassette which is rotatable in forward and reverse directions by a drive source so as to move a peripheral edge thereof over a predetermined range of angular movement;

a pair of elongated connectors (15,16) each having one end coupled to a point on the peripheral edge of said rotatable body and the other end movable over the given distance toward and away from the head cylinder upon rotation of said rotatable body in said forward and reverse directions, respectively, over said predetermined range of angular movement, wherein said one ends of said connectors are coupled to points on the peripheral edge of the rotatable body remote from the head cylinder with said connectors extending horizontally across said rotatable body at one end of said predetermined range of angular movement corresponding to the unloaded position of the tape, and said one ends of the connectors are moved upon rotation of said rotatable body proximate the head cylinder and said other ends thereof are driven to positions corresponding to the loaded position of the tape at the other end of said predetermined range of angular movement; and a pair of movable bodies (13, 14) each coupled to a respective one of said other ends of said pair of connectors (15, 16) and provided with means (13c, 14c) for engaging the tape in order to pull it from the cassette and bring it in sliding contact with the head cylinder, said movable bodies being movable toward and away from the cylinder head over the given distance between unloaded and loaded positions upon said forward and reverse rotations, respectively, of said rotatable body over said predetermined range of angular movement, whereby the loading of the tape in contact with the head cylinder is obtained by rotation of the single rotatable body, the rotatable body is disposed in parallel under the inserted tape cassette and substantially contained within the extent of the magnetic tape cassette periphery to reduce the size of the recorder-reproducer apparatus, and the movable bodies are moved by the connectors by rotation of the single rotatable body over the predetermined range of angular movement.

2. A tape loading device according to claim 1, wherein said rotatable body has a recessed portion (17e) defined therein such that one (16) of said pair of connectors can abut against said recessed portion at a position where said rotatable body has been rotated to one end of said predetermined range of angular movement, said recessed portion and said one connector constituting as a stopper defining one end of the range of angular movement of said rotatable body.

3. A tape loading device according to claim 1, wherein at least one of said connectors is formed by two connector plates (15a, 15b) being generally similar in shape and arranged in parallel with each other, one of said plates (15b) having one end coupled to said rotatable body and the other of said plates (15a) having its other end coupled to the associated movable body, means for restraining (15g, 13h, 15k, 15j) said two plates so that they are slidable relative to each other, and means including a first spring (15c) stretched between the two plates for biasing one plate in the same direction as the other plate is moved.

4. A tape loading device according to claim 3, further comprising a driven capstan shaft (24) positioned adjacent the inserted cassette, a pinch roller (25) movable to pinch the tape from the cassette against the capstan shaft so as to drive the tape therebetween, pinch roller drive means including a member (23) which is driven toward the capstan roller upon forward rotation of said rotatable body, and a second spring (28) provided between a forward end of said member and said pinch roller for biasing said pinch roller against said capstan shaft, said first spring providing a first force acting through said connector plates upon said rotatable body tending to hold it in a position corresponding to the loaded position which is greater than a second force generated by said second spring acting through said pinch roller drive means in opposite to said first force.

5. A tape loading device according to claim 1, wherein said at least one of said connectors (15) has a shape for avoiding abutment with said pivot shaft at a position corresponding to one end of said predetermined range of angular movement, whereby can extend a said one connector is arranged for movement without abutting said pivot shaft.

* * * * *

UNITED STATES PATENT AND TRADEMARK OFFICE
CERTIFICATE OF CORRECTION

PATENT NO. : 4,750,062

DATED : June 7, 1988

INVENTOR(S) : SHOJI SUZUKI

It is certified that error appears in the above-identified patent and that said Letters Patent is hereby corrected as shown below:

Claim 4, Col. 10, line 60, delete "opposite" and insert --opposition--;

Claim 5, Col. 10, lines 65-66, delete "whereby can extend a said one connector is", and insert --whereby said one connector is--.

Signed and Sealed this

Twenty-seventh Day of December, 1988

Attest:

DONALD J. QUIGG

*Attesting Officer*  *Commissioner of Patents and Trademarks*